United States Patent
Esmailzadeh (10) Patent No.: US 7,019,212 B1
(45) Date of Patent: Mar. 28, 2006

(54) COVER PLATE ARRANGEMENT

(76) Inventor: Rouhollah Esmailzadeh, 12173 Leven La., Los Angeles, CA (US) 90049

( * ) Notice: Subject to any disclaimer, the term of this patent is extended or adjusted under 35 U.S.C. 154(b) by 0 days.

(21) Appl. No.: 10/633,429

(22) Filed: Aug. 4, 2003

(51) Int. Cl.
*H02G 3/14* (2006.01)

(52) U.S. Cl. .................. 174/66; 174/67; 220/241

(58) Field of Classification Search .............. 174/66, 174/67, 135, 54; 362/147, 260, 404; 220/241, 220/242
See application file for complete search history.

(56) References Cited

U.S. PATENT DOCUMENTS

| | | | |
|---|---|---|---|
| 3,036,207 A * | 5/1962 | Endelson .................. 174/54 |
| 4,327,841 A * | 5/1982 | Wimberly .................. 220/477 |
| 6,390,646 B1 * | 5/2002 | Yan .......................... 362/260 |
| 6,447,145 B1 * | 9/2002 | Thomas et al. ........... 362/267 |
| 6,530,681 B1 * | 3/2003 | Sieczkowski ............. 362/404 |
| 6,649,837 B1 * | 11/2003 | Garvin ..................... 174/66 |
| 6,719,438 B1 * | 4/2004 | Sevack et al. ........... 362/147 |

* cited by examiner

*Primary Examiner*—Dhiru R. Patel
(74) *Attorney, Agent, or Firm*—Don Finkelstein (57) ABSTRACT

A cover plate for use in replacing recessed lighting fixtures with pendalier or external mounted lighting fixtures and provided with matching interconnection mounting members for cooperative engagement with a variety of mounting structure assemblies heretofore utilized in recessed down lights.

33 Claims, 6 Drawing Sheets

COVER PLATE ARRANGEMENT

BACKGROUND OF THE INVENTION

1. Field of the Invention

This invention relates to the lighting fixture art and more particularly to a cover plate arrangement adapted to both convert a recessed down light into a structure for mounting a dependent lighting fixture or provide a mounting for a new installation of a dependent or external lighting fixture.

2. Description of the Prior Art

Recessed down lights have been utilized in home, commercial and industrial applications for many years for directing a light beam through a hole in the ceiling to the area therebelow. The prior art recessed down lights included structure mounted above the plane of the lower surface of the ceiling and included various can type devices for retention of the light bulb, mounting structure for the can type device and a trim plate or rim surrounding the hole in the ceiling and through which the light bulb could be accessed for replacement. The holes in the ceiling to accommodate the down lights were substantially standardized as to the diameter thereof in order to match the size for conventional three inch, four inch, five inch and six inch size down lights. However, there have been many variations in the structure utilized for retention of the rims or other components in the down light assembly. In general, there have been two primary types of retention arrangements in the down lights. One of the prior art retention arrangements has been for the rim structure to have a plurality, usually three, upstanding, equally spaced, spring loaded hook type mounting fingers which project upwardly into the region above the ceiling for hooking engagement with an appropriate rim or other structure in the down light assembly. A second primary type mounting arrangement was to provide an inverted "C" shaped slot on the interior portion of the rim structure into which conventional "chicken leg" torsion spring wire retention devices were installed for engagement with a appropriate structure in the mounting arrangement above the ceiling level.

Another type of retention arrangement has been to retain a reflector and such structure has three equally spaced, punched out tongue or similar devices which engage a cooperative structure on the reflector for retention thereof.

In many applications it has been desired to change the down lights to a pendalier or other type of lighting fixture which is mounted below the plane of the lower surface of the ceiling. However, to accomplish such a replacement, a cover plate is required to cover the hole in the ceiling previously utilized in connection with the down light. One type of cover plate that has heretofore been utilized in some applications has been wherein there was provided a bridging structure such as a bar or other device having two spaced apart threaded apertures bridging the hole in the ceiling utilized by the down light. For such applications the cover plate had a pair of apertures therethrough in a spaced apart relationship and screws were inserted in the aperture to threadingly engage the matching threaded apertures in the bridging structure. Such a cover plate had the unsightly screw heads visible at the exterior surface of the cover plate and such cover plate did not have the structural elements necessary for attaching a new dependent or external lighting fixture. While such a cover plate did, in fact, cover the hole in the ceiling, the presence of screw heads detracted from the appearance of the cover plate. Further, if no nut type devices were appropriately positioned in the down light assembly for cooperative engagement with the screws inserted through the cover plate, such bridging structure over the hole in the ceiling had to be specially installed. In order to minimize cost, the cover plate for covering a hole in the ceiling of a down light when converting the down light to a pendalier or other type of externally mounted light fixture, it is desired that the cover plate be readily mountable in any type of the mounting arrangements heretofore utilized in mounting, for example, the rim of the down light. Additionally, the same type of cover plate should also be capable of utilization in new installations of pendalier or other externally mounted lighting fixtures particularly where the new lighting fixture was to be installed in a pattern where some, or most, of the pattern was previously comprised of down lights that were converted to an externally mounted lighting fixture.

Thus, there has long been a need for a cover plate to be utilized in both the conversion of down lights to externally mounted light fixtures and adaptable for installation and mounting in any of the three common mounting arrangements utilized in down lights as well as useful in mounting new externally mounted lighting fixtures.

SUMMARY OF THE INVENTION

Accordingly, it is an object of the present invention to provide a cover plate that may be conveniently utilized to cover the hole in the ceiling of a recessed down light after removal of the rim structure thereof.

It is another object of the present invention to provided a cover plate that may be utilized in retrofitting down light fixtures to a surface mounted external lighting fixture.

It is another object of the present invention to provide as cover plate that is readily attachable to a variety of mounting assemblies in existing recessed lighting fixtures.

It is yet another object of the present invention to provide as cover plate that is readily attachable to a variety of mounting assemblies in existing recessed lighting fixtures as well as useable in new installations of surface mounted external lighting fixtures.

It is a further object of the present invention to provide as cover plate that is readily attachable to a variety of mounting assemblies in existing recessed lighting fixtures as well as useable in new installations of surface mounted external lighting fixtures that is economical to manufacture and decorative when utilized.

The above, and other objects of the present invention are achieved, according to a preferred embodiment thereof, by providing a base plate of an appropriate diameter and having a central axis to cover the hole in the ceiling of an existing recessed down light which is to be converted to a pendalier light or other external light fixture. The base plate has an exterior or outer surface and an interior or inner surface and a preselected thickness therebetween. The size of the base plate is selected to cover at least the hole in the ceiling and may be greater than such hole as desired in some applications. The base plate has a peripheral edge extending therearound and there may be provided an outer rim around the peripheral edge and may extend inwardly from the inner surface any desired amount. If the rim is so utilized, the height of the rim may be selected to give the appearance of any desired thickness of the base plate when the cover plate is installed thereby to reduce the cost of providing an entire cover plate of the apparent thickness provided by the appearance formed by the rim. The inner edge of the outer rim abuts the lower surface of the ceiling surrounding the hole therein provided for the recessed down light.

An inner mounting plate which may be an "L" shaped plate in cross section has the a bottom or leg portion of the "L" coupled to the inner surface of the base plate and the upright portion of the "L" extending inwardly from the inner surface of the base plate. The leg portion of the inner mounting plate, in this preferred embodiment of the present invention, may have an outer peripheral edge spaced from the inner surface of the outer rim to define a shoulder portion therebetween. The diameter of the upright portion of the "L" of the inner mounting plate is selected to match the diameter of the inner interconnection structure of the recessed down light in order to allow convenient installation of the cover plate thereon. The interconnection portion of the recessed down light provided the necessary mounting assembly which allowed interconnection of the trim rim utilized to surround the hole in the ceiling through which the light from the recessed down light is directed to the area therebelow.

A plurality of mounting members are provided on the upright portion of the "L" of the inner mounting plate. A first portion of the plurality of mounting members may be hook type mounting members coupled to the inner mounting plate extending inwardly from the inner surface of the base plate. In the preferred embodiment of the present invention, it is desired to utilize five of the hook type mounting members. However, the number of hook type mounting members may be greater or less than five depending on the requirements of particular installations. A second portion of the mounting members may be slot mounting members in the form of an inverted "C" shaped slot. The inverted "C" shaped slot is adapted to receive the conventional "chicken leg" torsion spring wire retention devices.

A nipple accepting aperture is provided extending through the base plate and aligned with a central axis. An annular nipple of conventional design with a central passageway and external threads and preferably with wrench flats thereon is inserted into the nipple accepting aperture and has an inner portion extending inwardly from the inner surface of the base plate and an outer portion extending outwardly from the outer surface of the base plate. The outer portion of the nipple allows threading engagement with the desired external light fixture replacing the recessed down light. In this preferred embodiment of the present invention the base plate is free of any other apertures therethrough.

In use, to replace an existing recessed down light, the trim rim of the down light is removed and the bulb mounting structure thereof is also removed. The electrical conducting wires providing the electrical connection for a light bulb from the down light assembly are directed downwardly and extend through the central aperture of the nipple to regions external the base plate. The desired external light fixture may be threadingly connected to the external portion of the nipple and the electrical conducting wires appropriately connected thereto. The cover plate is then inserted over the hole in the ceiling and one or both of the two types of mounting members, the hook type mounting members and/or the "chicken leg" torsion spring devices engage the corresponding mounting structure in the recessed down light assembly.

The cover plate of the preferred embodiment of the present invention may also be utilized in new construction wherein an external lighting fixture is desired. Such applications often occur where a plurality of recessed down lights in a particular pattern or array are replaced with the cover plate of the present invention having the desired external light fixture mounted thereon and additional lighting fixtures are desired. The cover plate of the present invention in such embodiments provides a matching appearance to the new pattern or array of lighting fixtures. Alternatively, in new installations of external lighting fixtures, the cover plate of the present invention with the desired external lighting fixture thereon may be installed after installation of the required internal mounting assembly above the ceiling. As is well known in the prior art, the mounting assemblies of recessed down lights or other ceiling mounted light fixtures must, from safety considerations, be of a configuration that meets the many regulations defined by the various building codes, or other rules and regulations, in the geographical area of the installation. The cover plate of the present invention is compatible for installation in all such mounting assemblies.

BRIEF DESCRIPTION OF THE DRAWING

The above and other embodiments of the present invention may be more fully understood from the following detailed description taken together with the accompanying drawing wherein similar reference characters refer to similar elements throughout and in which.

DESCRIPTION OF THE PREFERRED EMBODIMENTS

Referring now to the drawing there is illustrated in FIGS. 1, 2, 3 and 4 a preferred embodiment, generally designated 10 of the cover plate 12 according to the principles of the present invention. The cover plate 12 has a base plate 14 having an outer surface 16 and an inner surface 18. The base plate 14 has a peripheral edge 20 extending between the outer surface 16 and the inner surface 18. The peripheral edge 20 in this embodiment 10 of the present invention has a predetermined geometrical shape which is circular. In other embodiments of the present invention the preselected geometrical shape of the peripheral edge 20 of the base plate 14 may be any desired configuration for aesthetic or other functional reasons as may be desired or required for a particular installation. The base plate 14 has a central axis 22. The base plate 14 has walls 24 defining a nipple accepting aperture 26 therethrough aligned with the central axis 22. In the preferred embodiment 10, the base plate 14 is free of any other apertures therethrough.

Figure 4:
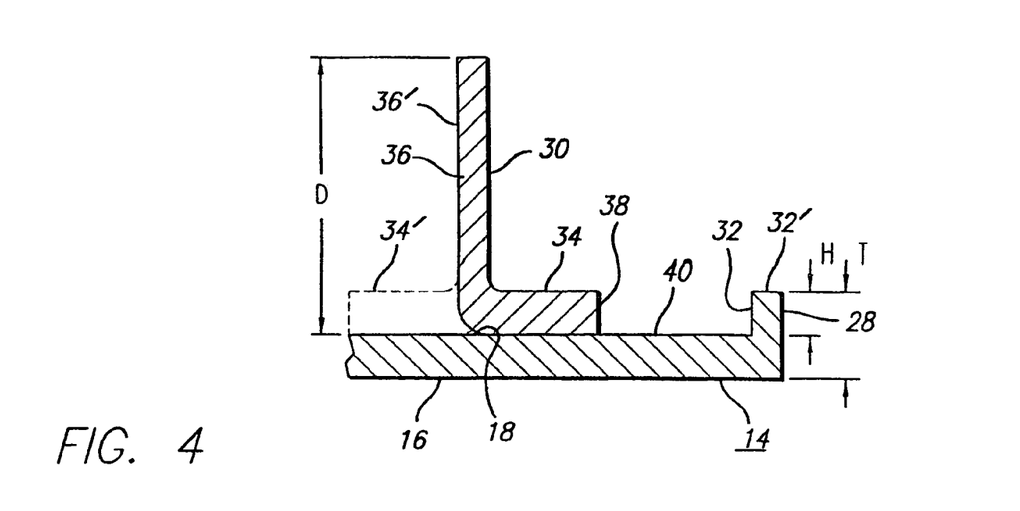
FIG. 4 is a partial sectional view along the line 4—4 of FIG. 3.

An outer rim 28 is provided along the peripheral edge 20 and extends a first preselected distance inwardly from the inner surface 18 of the cover plate 14 as shown most clearly on FIG. 4. The height of the outer rim 28 indicated on FIG. 4 at H from the inner surface 18 of the base plate 14 to the inner edge 32' of the outer rim 32 may be selected as desired to provide the appearance of any desired thickness T of the base plate 14 as may be desired for particular applications. The inner edge 32' of the outer rim 32 abuts against the inner surface of the ceiling (not shown) after mounting of the cover plate 12. Alternatively, the base plate 14 may be fabricated in the desired thickness T as indicated on FIG. 4. The preselected geometrical configuration of the outer peripheral edge 20 of the base plate 14 may be any desired configuration as required or desired for particular applications and/or installations.

An inner mounting plate 30 is coupled to the inner surface 18 of the base plate 14. In the preferred embodiment 10 of the present invention, the inner mounting plate 30 has an "L" shaped configuration and extends around and spaced toward the central axis 22 from the inner surface 32 of the outer rim 28. Inner mounting plate 30 has a base flange or leg portion 34 of the "L" shaped inner mounting plate 30 coupled to the inner surface 18 of the base plate 12 and the base flange or leg portion 34 has a peripheral edge 38 spaced from the inner surface 32 of the outer rim 28 to define a shoulder portion 40 therebetween. Inner mounting plate 30 also has an upright portion 36 extending inwardly from the inner surface 18 of the base plate 14 a second preselected distance indicated on FIG. 4 at D which is greater than the first preselected distance H. The diameter of the upright portion 36 of the inner mounting plate 30 is selected to match the mounting assembly structure as discussed below of the recessed down light (not shown) that is to be replaced. Such mounting assembly structures have been substantially standardized with respect to the dimensions and the various mounting configurations thereof as utilized in the electrical light fixture industry.

In other embodiments of the present invention the base flange or leg portion of the "L" shaped inner mounting plate 30 may be directed inwardly toward the central axis 22 as indicted by the dotted line showing 34' on FIG. 4. In other embodiments of the present invention the upright portion of the inner mounting plate 30 may be welded, braised or otherwise secured to the inner surface 18 of the base plate 14, for example by a plurality of angle brackets, so as to eliminate the base flange or leg portion 34. The particular method chosen to fasten the upright portion 36 of the inner mounting plate 30 to the base plate 14 may be selected depending on the requirements of the particular application and the economy of manufacturing.

Figure 1:
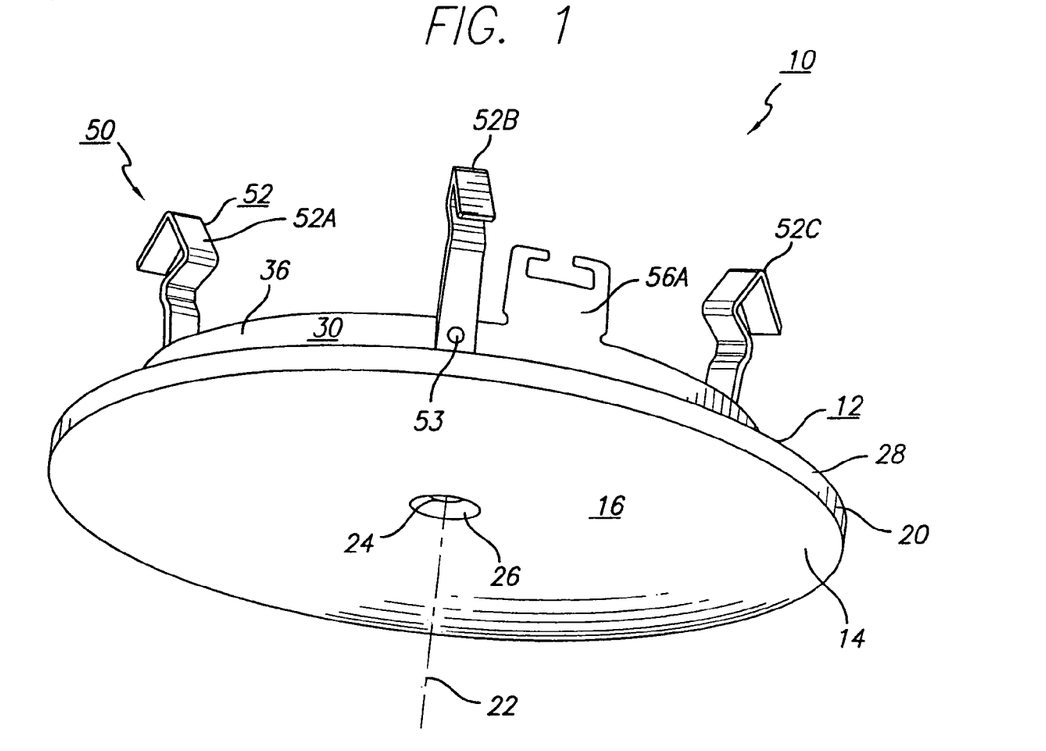
FIG. 1 is a perspective view of a cover plate according to the principles of the present invention.
Figure 2:
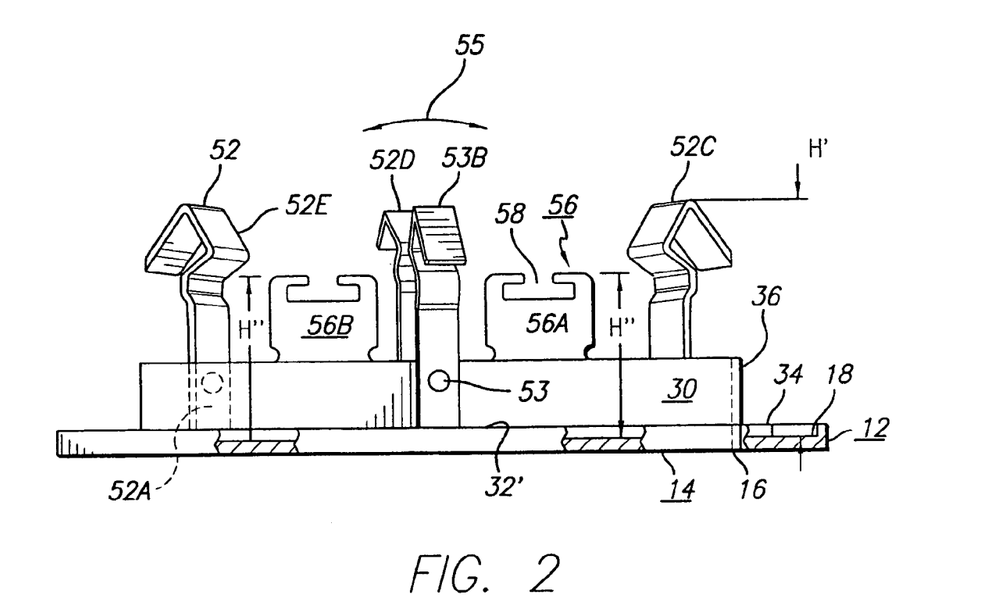
FIG. 2 is a side view of the embodiment shown in FIG. 1.
Figure 3:
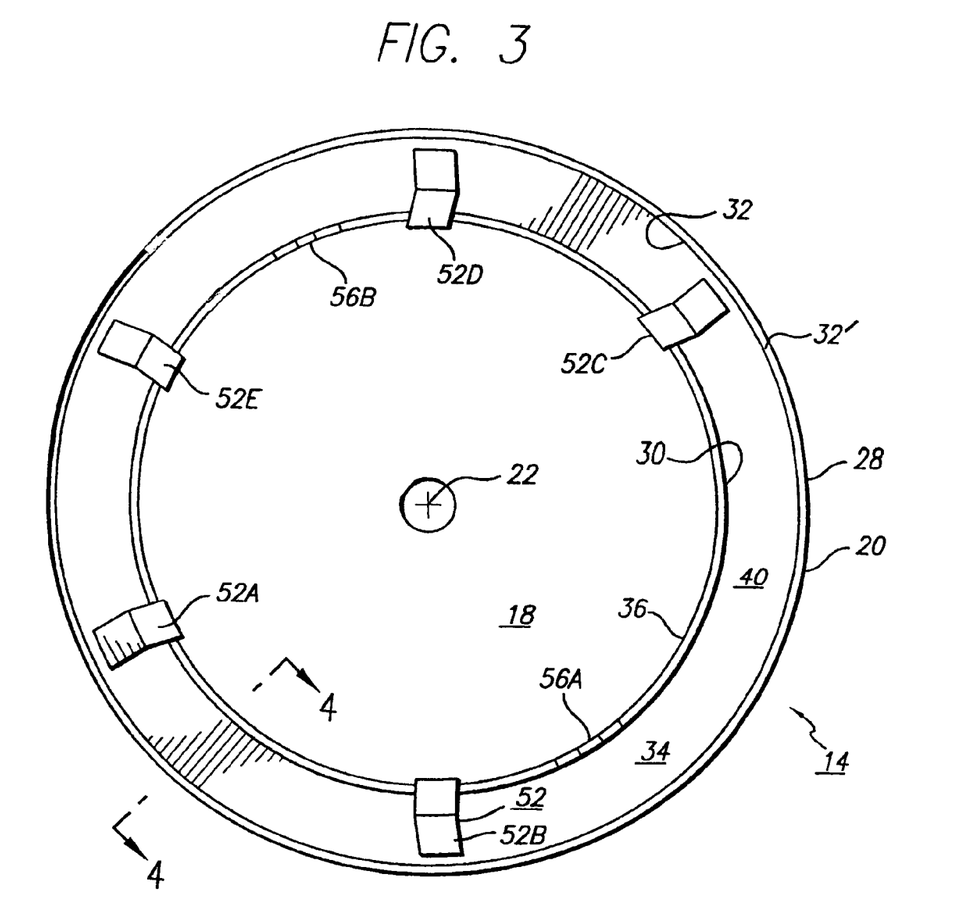
FIG. 3 is view along the line 3—3 of FIG. 1.

As shown most clearly in FIGS. 1, 2 and 3, a plurality of mounting members 50 are on the upright portion 36 of the inner mounting plate 30. The plurality of mounting members 30 provides the structure for the interconnection to the mounting structure assembly on the recessed light fixture housing in the applications of the present invention wherein a recessed lighting fixture is to be replaced by an external lighting fixture.

A first portion 52 of the plurality of mounting members 50 are hook mounting members which has, in this embodiment 10 of the present invention, five hook mounting members 52A, 52, 52C, 52D and 52E are coupled to the upright portion 36 of the inner mounting member 30 by, for example, rivet 53. The rivet 53 may provide either a fixed coupling of the hook mounting members 52 or a pivotal mounting of the hook mounting members 52 to allow at least some pivotal movement thereof in the directions indicated by the arrow 55 to accommodate various ceiling thicknesses, mounting assembly configurations to which the cover plate 14 is to be attached, or the like. The use of five hook mounting members 52 is often desired because of the weight of the external fixture to be mounted on the cover plate 30 as described below whereas one of the conventional mounting arrangements in recessed lighting fixtures in the electrical lighting fixture art for connection, for example, by a trim rim, is to utilize three hook members for connection to a recessed lighting fixture. However, the use of more than five hook members or less than five hook members may be selected as required or desired for particular applications. The hook mounting members 52A, 52B 52C, 52D and 52E are spaced around the upright portion 36 of the inner mounting plate 30. The first plurality of hook mounting members 52 extend inwardly a third preselected distance indicated at H' on FIG. 1 from the inner surface 18 of base plate 14.

A second portion 56 of the plurality of mounting members 50 has, a pair of slot type mounting members 56A and 56B. Each of the slot type mounting members 56A and 56B has an inverted "C" shaped slot therein as indicated a 58. The "C" shaped slot has a vertical passage way 60 communicating with a horizontally disposed slot 60. The slot type mounting members 56A and 56B are mounted on, or made as a part of the inner mounting plate 30 on the upright portion 36 thereof and extend a fourth preselected distance above the inner surface 18 of the base plate 14 as indicated at H". The slot type mounting members 56A and 56B are adapted to receive a conventional "chicken leg" torsion spring retention devoices of the type well known in the prior art.

Figure 6:
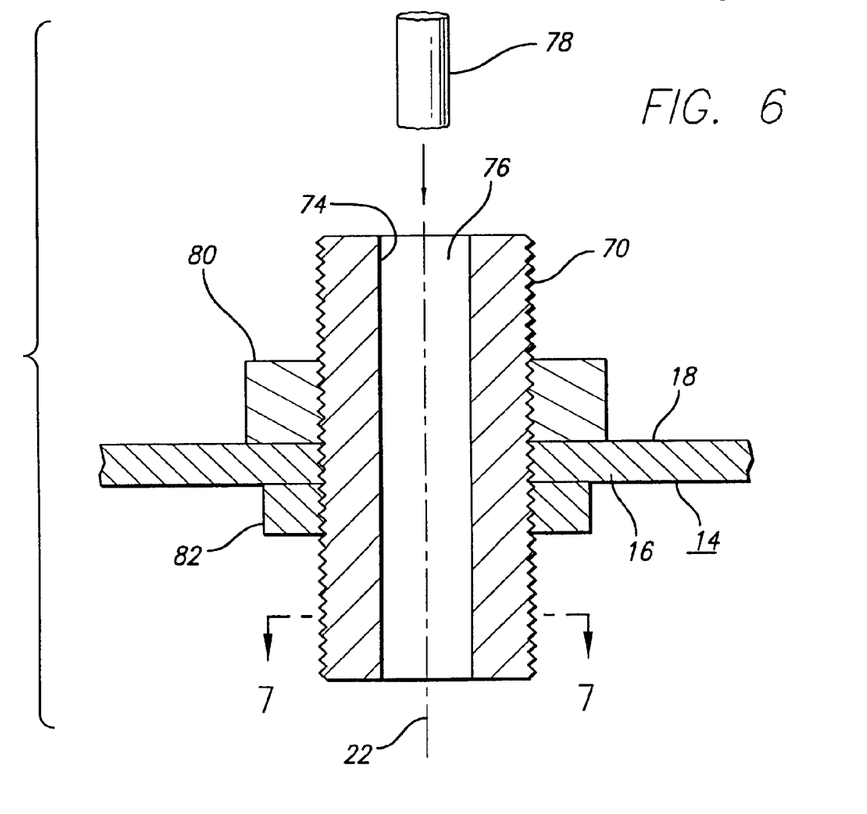
FIG. 6 is a partial sectional view of a nipple inserted into the base plate of the present invention.
Figure 7:
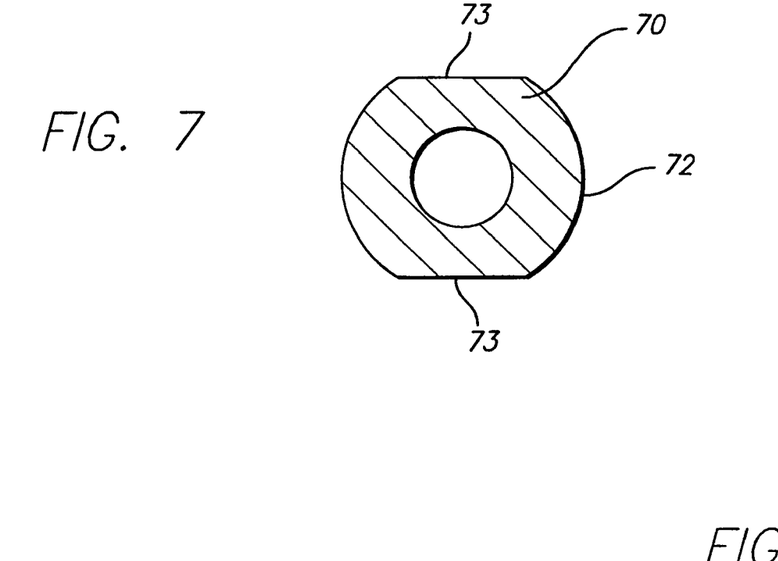
FIG. 7 is a sectional view along the line 7—7 of FIG. 6.

The utilization of the cover plate 14 is achieved by inserting a conventional externally threaded nipple, preferably with wrench flats thereon, as is well known in the lighting fixture art, into the nipple accepting aperture 26. FIGS. 6 and 7 illustrate a nipple 70 inserted into the nipple accepting aperture 26 and the nipple 70 is tubular with a threaded external surface 72 and with walls 72 defining an internal wire accepting aperture 76 to allow passage of the electrical conducting wires 78 therethrough to regions external the outer surface 16 of the base plate 14 for connection to an externally mounted light fixture as described below in connection with FIGS. 8, 9 and 10.

In preferred embodiments of the present invention, the nipple 70 has wrench flats 73 thereon for convenience in installation thereof. However, in some applications it may be desired to provide a nipple with no wrench flats. The nipple is held in place on the base plate 14 by an inner nut 80 that threadingly engages the outer surface 72 of the nipple 70 and bears against the inner surface 18 of the base plate 14. An outer nut 82 may be utilized and threadingly engages the outer surface 72 of the nipple 70 and bears against the outer surface 16 of the base plate 14. As described below in connection with FIGS. 8 and 10 an externally mounted lighting fixture may have structure that is utilized to replace the function of the outer nut 82 to retain the nipple 70 in place.

Figure 5:
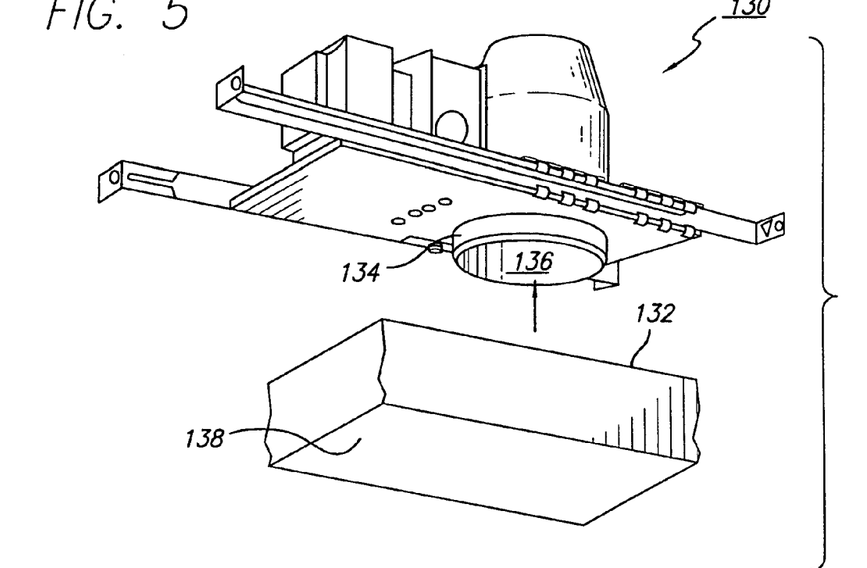
FIG. 5 is a perspective view of a conventional down light mounting structure on which the cover plate of the present invention may be mounted; is a partial sectional view taken along the line 5—5 of FIG. 3.

Referring to FIG. 5, there is shown a conventional down light mounting structure generally designated 130 which is positioned above the ceiling 132. The down light mounting structure 132 has a lower rim 134 that projects into the ceiling 132. Internally of the mounting structure 130 are the appropriate interconnection devices for supporting the base plate of the present invention. The inner mounting plate 30 of a cover plate 12 is inserted into the opening 136 of the mounting structure 130. The mounting members 50 of the cover plate 12 engage internal structure in the mounting structure 130 to provide the desired mounting of the cover plate 12 in the mounting structure 130 so that the inner surface 18 thereof is against the outer surface 138 of the ceiling 132.

Figure 8:
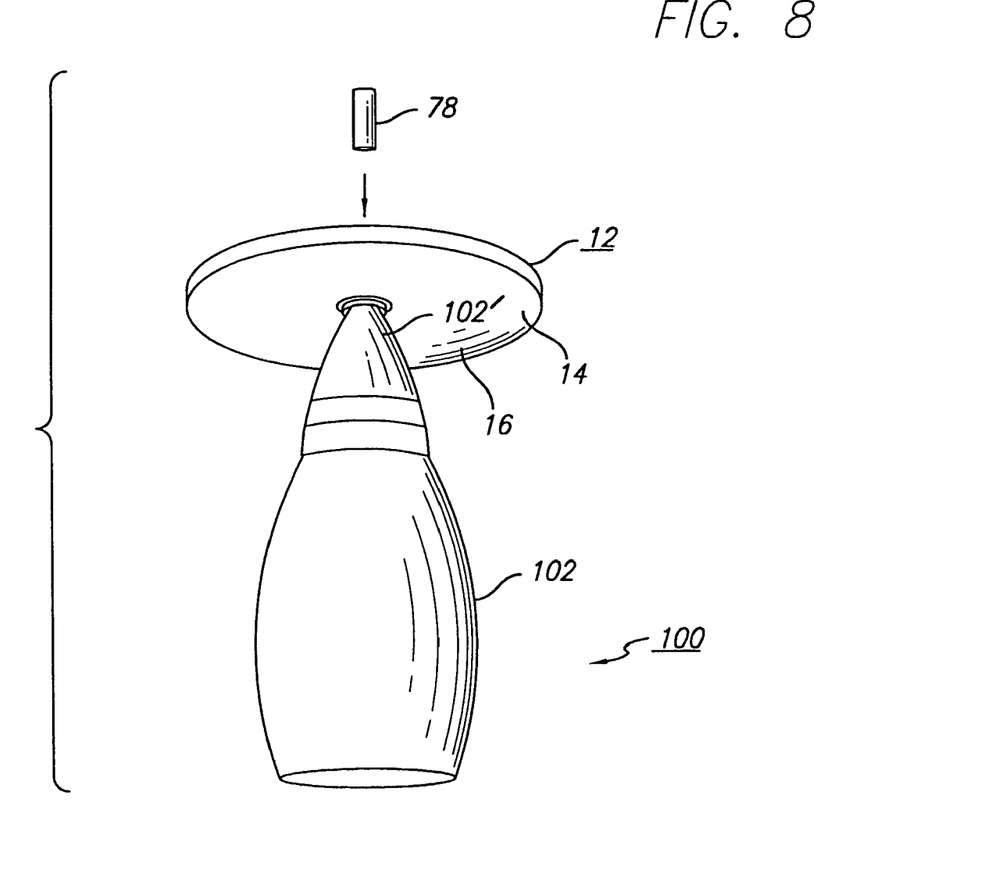
FIG. 8 is a perspective view of a close coupled pendalier external lighting fixture mounted on the cover plate of the present invention.

Referring now to FIG. 8 there is shown an embodiment 100 of the present invention in which a close coupled pendalier external mounted lighting fixture 102 is mounted on the base plate 14 of a cover plate 12. The inner mounting plate 30 and the plurality of various mounting members 50 have been omitted from FIG. 8 for clarity in description. The electrical conducting wire 78 extends through a nipple in the base plate 14, as shown in FIG. 6 and into the lighting fixture 102 for appropriate connection for providing electrical current to a light bulb contained in the lighting fixture 102. In the embodiment 100 the upper portion 102' of the lighting fixture 102 may threadingly engage the nipple to hold the lighting fixture 102 against the outer surface 16 of the base plate 14 of the cover plate 12.

Figure 9:
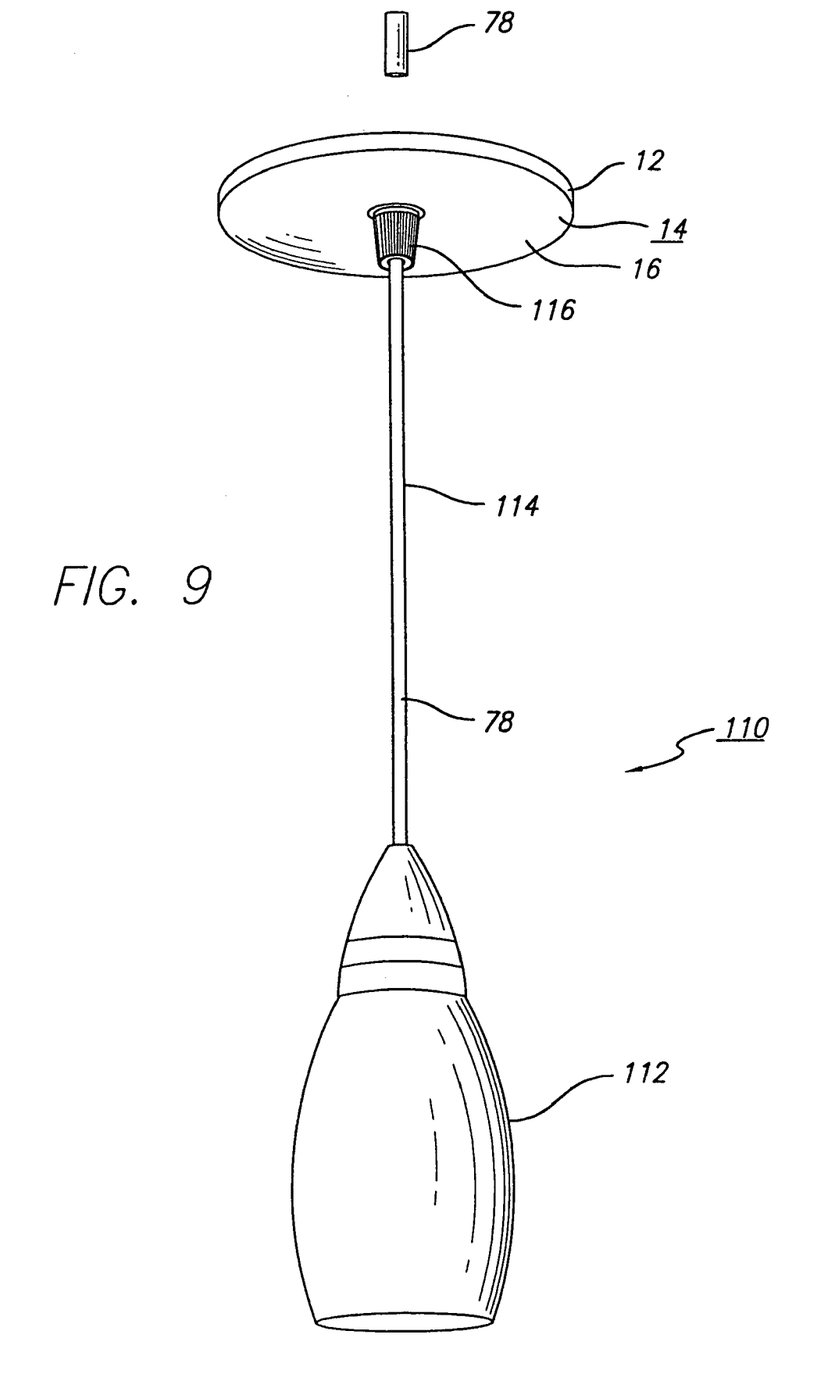
FIG. 9 is a perspective view of another pendalier external lighting fixture mounted on the cover plate of the present invention; and, FIG. 10 is a perspective view of another external lighting fixture mounted on the cover plate of the present invention.

Referring now to FIG. 9 there is shown an embodiment 110 of the present invention in which a remote coupled pendalier external mounted lighting fixture 112 is mounted on the base plate 14 of a cover plate 12. The inner mounting plate 30 and the plurality of various mounting members 50 have been omitted from FIG. 9 for clarity in description. The electrical conducting wire 78 extends through a nipple as described above in connection with FIGS. 6 and 7 and extends a predetermined outward distance from the base plate as shown at 114 and into the lighting fixture 112 for appropriate connection for providing electrical current to a light bulb contained in the lighting fixture 112. In the embodiment 110 there may be provided a decorative outer nut 116 that threadingly engages the nipple to retain the nipple in place in the base plate 14.

Figure 10:
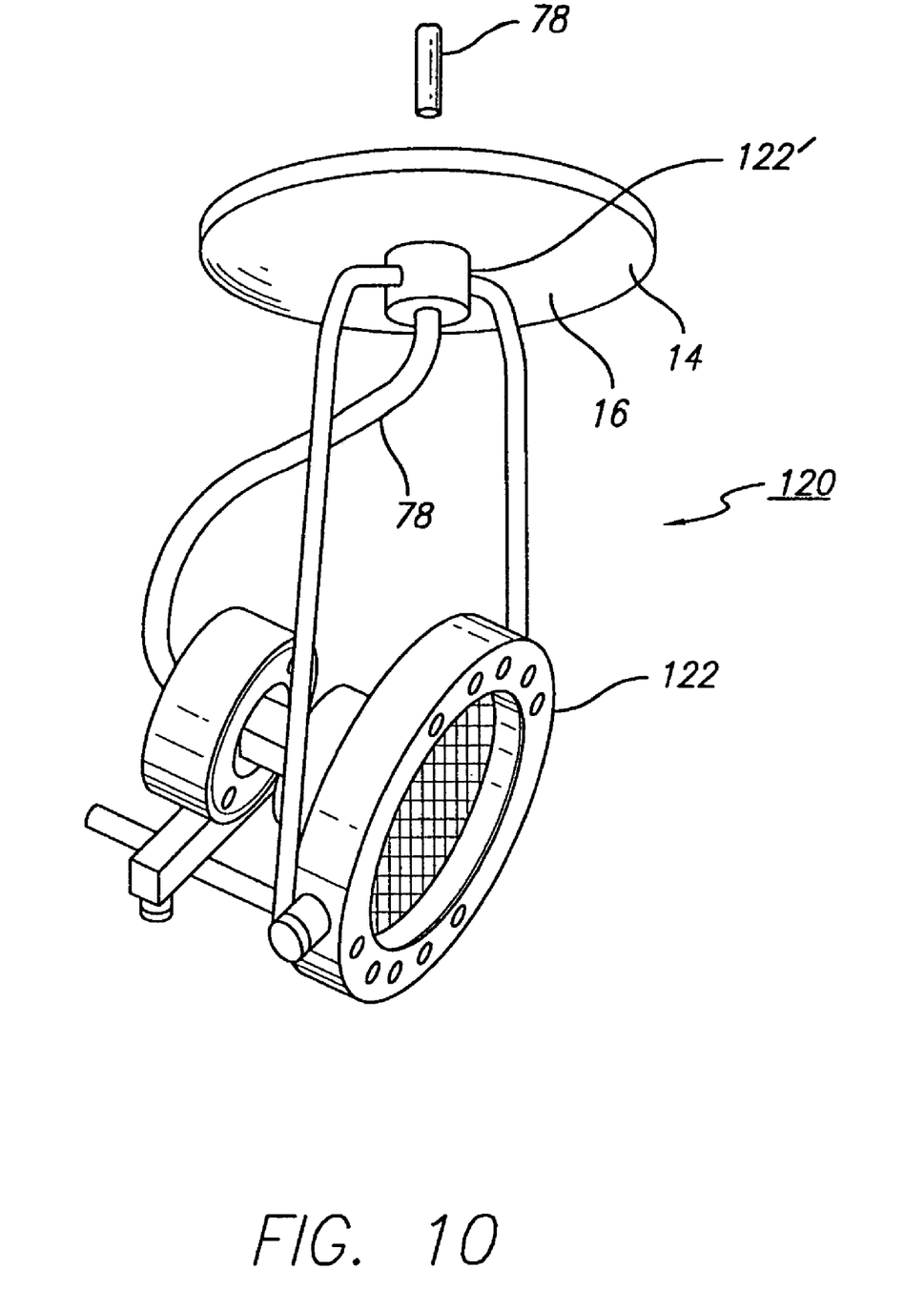

Referring now to FIG. 10 there is shown an embodiment 120 of the present invention in which an externally mounted lighting fixture 122 is mounted on the base plate 14 of a cover plate 12. The inner mounting plate 30 and the plurality of various mounting members 50 have been omitted from FIG. 10 for clarity in description. The electrical conducting wire 78 extends through a nipple in the base plate 14 as described above in connection with FIG. 6 and into the lighting fixture 122 for appropriate connection for providing electrical current to a light bulb contained in the lighting fixture 122. In the embodiment 120 the upper portion 122' of the lighting fixture 122 may threadingly engage the nipple to hold the lighting fixture 122 against the outer surface 16 of the base plate 14 of the cover plate 12.

The lighting fixtures illustrated in FIGS. 8, 9 and 10 are only illustrative of the great variety of lighting fixtures that may be utilized in the present invention to replace an existing recessed down light or, as may be desired, in a new installation.

Although specific embodiments of the present invention have been described above with reference to the various Figures of the drawing, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

What is claimed is:

1. A cover plate arrangement for interconnection to a recessed lighting fixture, comprising, in combination:
a base plate having an outer surface, an inner surface spaced from said outer surface and a peripheral edge extending between said outer surface and said inner surface, and said peripheral edge having a predetermined geometrical configuration;
an outer rim along said peripheral edge and extending a first preselected distance inwardly from said inner surface of said base plate;
an inner mounting plate coupled to said inner surface of said base plate and said inner mounting plate having a bottom flange portion adjacent said inner surface of said base plate and said bottom flange portion having an outer edge spaced from said outer rim, and an upright flange portion spaced from said outer edge of said bottom flange portion and extending inwardly from said inner surface of said base plate a second preselected distance greater than said first preselected distance;
a plurality of mounting members on said upright flange for interconnection mounting to a recessed lighting housing, and a first portion of said plurality of mounting members having a first predetermined number of hook mounting members extending inwardly from said inner surface of said base plate a third preselected distance greater than said second predetermined distance, and a second portion of said plurality of mounting members having a second predetermined number of slot mounting members spaced a fourth preselected distance from said inner surface of said base plate; and,
said base plate having walls defining a nipple accepting aperture therethrough and free of other apertures therethrough,
whereby a nipple may be inserted into said nipple accepting aperture and a light fixture may be connected to said nipple at the outer surface of said base plate.

2. The arrangement defined in claim 1 wherein:
said first predetermined number of hook mounting members is five.

3. The arrangement defined in claim 1 wherein:
said second predetermined number of tongue mounting members is two.

4. The arrangement defined in claim 1 wherein:
said first predetermined number of hook mounting members is between two and five.

5. The arrangement defined in claim 1 wherein:
said predetermined geometrical shape of said peripheral edge of said base plate is circular and having a central axis, and,
said nipple accepting aperture is aligned with said central axis.

6. The arrangement defined in claim 5 wherein:
said outer edge of said bottom flange portion of said inner mounting member defines an annular shoulder with said outer rim.

7. The arrangement defined in claim 6 wherein:
said hook mounting members are pivotally connected to said upright flange of said inner mounting member.

8. The arrangement defined in claim 7 wherein:
said first predetermined number of hook mounting members is five; and,
said second predetermined number of tongue mounting members is two.

9. A cover plate arrangement comprising, in combination:
a circular base plate having an outer surface and an inner surface and a central axis, and walls defining a nipple accepting aperture alined with said central axis and extending throughsid base plate, and said base plate and free of other apertures therethrough;

an "L" shaped inner mounting plate, and the leg portion of said "L" shaped inner mounting plate coupled to said inner surface of said base plate and the upright portion of said "L" shaped mounting plate extending inwardly from said inner surface of said base plate;

a plurality of mounting members on said upright portion of said "L" shaped mounting plate and at least one of said plurality of mounting members is a hook mounting member.

10. The arrangement defined in claim 9 wherein:

at least another one of said plurality of mounting members is a slot mounting member.

11. A cover plate arrangement comprising, in combination:

a circular base plate having an outer surface and an inner surface and a central axis, and walls defining a nipple accepting aperture alined with said central axis and extending therethrough and said base plate free of other apertures therethrough;

an "L" shaped inner mounting plate, and the leg portion of said "L" shaped inner mounting plate coupled to said inner surface of said base plate and the upright of said "L" shaped mounting plate extending inwardly from said inner surface of said base plate;

a plurality of mounting members on said upright portion of said "L" shaped mounting plate for interconnection to a recessed lighting fixture and said plurality of mounting members comprising at least five hook mounting members, and at least two slot mounting members.

12. The arrangement defined in claim 11 and further comprising:

an outer rim on said base plate and extending therearound;

said inner mounting plate having a peripheral edge spaced from said outer rim and defining a shoulder therebetween.

13. The arrangement defined in claim 12 wherein:

at least some of said hook mounting members are pivotally connected to said inner mounting plate.

14. A cover plate arrangement comprising, in combination:

a base plate having an outer surface and an inner surface and a central axis, and walls defining a nipple accepting aperture alined with said central axis and extending therethrough;

an inner mounting plate extending inwardly from said inner surface of said base plate;

a plurality of mounting members on said inner mounting plate for interconnection to a recessed lighting fixture and said plurality of mounting members comprising at least one hook mounting member.

15. A cover plate arrangement comprising, in combination:

a base plate having an outer surface and an inner surface and a central axis, and walls defining a nipple accepting aperture alined with said central axis and extending therethrough;

an inner mounting plate extending inwardly from said inner surface of said base plate;

a plurality of mounting members on said inner mounting plate for interconnection to a recessed lighting fixture and said plurality of mounting members comprising at least one hook mounting member and said plurality of mounting members comprising at least one slot mounting member.

16. The arrangement defined in claim 14 wherein:

said plurality of mounting members comprises five hook mounting members.

17. A cover plate arrangement comprising, in combination:

a base plate having an outer surface and an inner surface and a central axis, and walls defining a nipple accepting aperture alined with said central axis and extending therethrough;

an inner mounting plate extending inwardly from said inner surface of said base plate;

a plurality of mounting members on said inner mounting plate for interconnection to a recessed lighting fixture and said plurality of mounting members comprising five hook mounting member and said plurality of mounting members comprises two slot mounting members.

18. A cover plate arrangement for attachment to a ceiling mounted recessed down light fixture, comprising, in combination:

a base plate having an outer surface and an inner surface, and walls defining a nipple accepting aperture extending therethrough and a peripheral edge having a preselected geometric configuration, and said inner surface adapted to be placed in proximity to the ceiling in regions adjacent to the ceiling mounted recessed down light fixture;

an inner mounting plate fixedly coupled to said base plate and spaced from said peripheral edge of said base plate towards said central axis and said inner mounting plate having a bottom portion on said inner surface of said base plate and an upright portion extending inwardly from said inner surface of said base plate towards the ceiling mounted recessed down light fixture, a plurality of mounting members on said inner mounting plate for interconnection to the ceiling mounted recessed down light fixture.

19. The arrangement defined in claim 18 wherein:

said base plate has an outer rim portion extending inwardly from said inner surface of said base plate a first preselected distance;

said bottom portion of said inner mounting plate has a peripheral edge spaced toward said central axis from said peripheral edge of said base plate.

20. The arrangement defined in claim 19 wherein:

said peripheral edge of said base plate comprises an outer edge of said rim portion of said base plate; and, a plurality of mounting members on said inner mounting plate for interconnection to the ceiling mounted recessed down light fixture.

21. The arrangement defined in claim 20 wherein:

said upright portion of said inner mounting plate comprises an upright flange portion extending inwardly from said base plate a second preselected distance greater than said first preselected distance.

22. The arrangement defined in claim 21 wherein:

said upright flange portion of said inner mounting plate is adapted to be inserted into the ceiling mounted recessed down light fixture.

23. The arrangement defined in claim 21 wherein:

said bottom portion of said inner mounting plate further comprises a bottom flange portion and said bottom flange portion is fixedly coupled to said inner surface of said base portion.

24. The arrangement defined in claim 23 wherein:
said bottom flange portion of said inner mounting plate extends a first predetermined distance from said upright flange portion of said inner mounting plate towards said central axis.

25. The arrangement defined in claim 23 wherein:
said bottom flange portion of said inner mounting plate extends a second predetermined distance from said upright flange portion of said inner mounting plate towards said rim portion of said base plate and said peripheral edge of said bottom flange portion of said inner mounting plate is spaced from said outer rim portion of said base plate.

26. The arrangement defined in claim 25 wherein:
said outer rim portion of said base plate has an inner edge space a third preselected distance from said outer surface of said base plate and said third preselected distance is greater than said first preselected distance and less than said second preselected distance.

27. The arrangement defined in claim 26 wherein:
said base plate has a central axis;
said upright flange portion is tubular about said central axis.

28. The arrangement defined in claim 27 wherein:
said preselected geometric configuration of said peripheral edge of said base plate is circular.

29. The arrangement defined in claim 28 wherein:
said peripheral edge of said bottom flange portion of said inner mounting plate has a second preselected configuration.

30. The arrangement defined in claim 29 wherein:
said first preselected geometric configuration of said peripheral edge of said base plate is the same as said second preselected geometric configuration of said peripheral edge of said bottom flange portion of said inner mounting plate.

31. The arrangement defined in claim 30 wherein:
said first preselected geometric configuration of said peripheral edge of said base plate is circular about said central axis and said second preselected geometric configuration of said peripheral edge of said bottom flange portion of said inner mounting plate is circular about said central axis.

32. The arrangement defined in claim 29 wherein:
said first preselected geometric configuration of said peripheral edge of said base plate is different from said second preselected geometric configuration of said peripheral edge of said bottom flange portion of said inner mounting plate.

33. The arrangement defined in claim 18 wherein:
said preselected geometric configuration of said base plate is circular.

* * * * *